United States Patent
Gulwani et al.

(10) Patent No.: US 11,620,115 B2
(45) Date of Patent: *Apr. 4, 2023

(54) OUTPUT PREFIX SPECIFICATION TRANSFORMERS

(71) Applicant: Microsoft Technology Licensing, LLC, Redmond, WA (US)

(72) Inventors: Sumit Gulwani, Sammamish, WA (US); Abhishek Udupa, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 262 days.

This patent is subject to a terminal disclaimer.

(21) Appl. No.: 16/827,368

(22) Filed: Mar. 23, 2020

(65) Prior Publication Data

US 2020/0257509 A1 Aug. 13, 2020

Related U.S. Application Data

(63) Continuation of application No. 15/961,423, filed on Apr. 24, 2018, now Pat. No. 10,635,414.

(51) Int. Cl.
*G06F 8/30* (2018.01)
*G06F 8/40* (2018.01)
*G06F 40/16* (2020.01)
*G06F 40/18* (2020.01)

(52) U.S. Cl.
CPC .............. *G06F 8/40* (2013.01); *G06F 8/30* (2013.01); *G06F 40/16* (2020.01); *G06F 40/18* (2020.01)

(58) Field of Classification Search
None
See application file for complete search history.

(56) References Cited

U.S. PATENT DOCUMENTS 8,799,234 B2 * 8/2014 Gulwani ................ G06F 40/16
707/687
8,972,372 B2 * 3/2015 Elbaum .................. G06F 16/93
707/706

(Continued)

OTHER PUBLICATIONS

Le et al. "Interactive Program Synthesis", Oct. 3, 2017, Cornell University, retrieved from <https://arxiv.org/abs/1703.03539> (Year: 2017).*

*Primary Examiner* — Jason D Mitchell
(74) *Attorney, Agent, or Firm* — Schwegman Lundberg & Woessner, P.A.

(57) ABSTRACT

Systems, methods, and computer-executable instructions for synthesizing programs using a prefix of an output. A specification of a task to synthesize a program in a domain specific language (DSL) is received. The specification includes an input and a corresponding prefix of the output. Programs for the task are synthesized. The synthesizing includes generating sub-goals based on the specification. Each of the synthesized programs include a solved subset of sub-goals and each sub-goal includes a symbol in the DSL. The symbol is transformed based on the DSL. The sub-goals are solved based on the transforming of the symbol using the input and the corresponding prefix of the output to generate the synthesized programs. The prefix of the output matches a prefix of an output from each of the plurality of synthesized programs.

20 Claims, 7 Drawing Sheets

(56) References Cited

U.S. PATENT DOCUMENTS

| | | | | |
|---|---|---|---|---|
| 8,972,930 | B2* | 3/2015 | Gulwani | G06F 8/30 |
| | | | | 717/107 |
| 10,635,414 | B2* | 4/2020 | Gulwani | G06F 8/35 |
| 10,795,645 | B2* | 10/2020 | Mohamed | G06N 3/08 |
| 2017/0344534 | A1* | 11/2017 | Scally | G06F 16/3344 |
| 2018/0276535 | A1* | 9/2018 | Mohamed | G06N 3/0472 |
| 2019/0212989 | A1* | 7/2019 | Polozov | G06F 8/33 |

* cited by examiner

|   | A 302 | B 304 |
|---|---|---|
| 1 | JOHN GALT | GALT, JOHN |
| 2 | JOHN DOE | DOE, JOHN |
| 3 | MITCH MITCHELL | |
| 4 | JOHN HENRY BONHAM | |
| 5 | KEITH MOON | |
| 6 | ERIC CARR | |
| 7 | TOMMY RAMONE | |
| 8 | TIM "HERB" ALEXANDER | |

|   | A 302 | B 304 |
|---|---|---|
| 1 | JOHN GALT | GALT, JOHN |
| 2 | JOHN DOE | DOE, JOHN |
| 3 | MITCH MITCHELL | MITCHELL, MITCH |
| 4 | JOHN HENRY BONHAM | HENRY BONHAM, JOHN |
| 5 | KEITH MOON | MOON, KEITH |
| 6 | ERIC CARR | CARR, ERIC |
| 7 | TOMMY RAMONE | RAMONE, TOMMY |
| 8 | TIM "HERB" ALEXANDER | "HERB" ALEXANDER, TIM |

|   | A 302 | B 304 |
|---|---|---|
| 1 | JOHN GALT | GALT, JOHN |
| 2 | JOHN DOE | DOE, JOHN |
| 3 | MITCH MITCHELL | MITCHELL, MITCH |
| 4 | JOHN HENRY BONHAM | BO| |
| 5 | KEITH MOON | BONHAM, JOHN |
| 6 | ERIC CARR | BONHAM, HENRY |
| 7 | TOMMY RAMONE | BONHAM, JOHN HENRY |
| 8 | TIM "HERB" ALEXANDER | BONHAM, J HENRY |

| | A 302 | B 304 | |
|---|---|---|---|
| 1 | JOHN GALT | GALT, JOHN | ⎬ 310 |
| 2 | JOHN DOE | DOE, JOHN | ⎬ 312 |
| 3 | MITCH MITCHELL | MITCHELL, MITCH | ⎬ 320 |
| 4 | JOHN HENRY BONHAM | BONHAM, JOHN | ⎬ 404 |
| 5 | KEITH MOON | MOON, KEITH | ⎬ 502 |
| 6 | ERIC CARR | CARR, ERIC | ⎬ 504 |
| 7 | TOMMY RAMONE | RAMONE, TOMMY | ⎬ 506 |
| 8 | TIM "HERB" ALEXANDER | ALEXANDER, TIM | ⎬ 510 |

*FIG. 5*

OUTPUT PREFIX SPECIFICATION TRANSFORMERS

RELATED APPLICATION

This application is a continuation application of U.S. patent application Ser. No. 15/961,423, filed Apr. 24, 2018, which application is incorporated herein by reference in its entirety.

BACKGROUND

Program Synthesis systems synthesize a program from a given Domain Specific Language (DSL), starting from a given specification. Programming-by-example systems are an example of one type of program synthesis systems. The specification may include a small number of input-output examples provided by the user. Providing all of the possible or even a large number of input-output examples may not be feasible or desirable for the user. Providing additional input-output examples, however, is useful in synthesizing programs that produce more accurate output over a larger number of inputs.

BRIEF DESCRIPTION OF DRAWINGS

FIG. 3A is an example spreadsheet application where some data is used in input-output examples in accordance with respective examples.

FIG. 3B is an example spreadsheet application where output data is generated using a synthesized program in accordance with respective examples.

FIG. 4 is an example spreadsheet application where a prefix of corrective output is used to predict the entire output in accordance with respective examples.

FIG. 5 is an example spreadsheet application where output data is updated based on selecting a corrective output value in accordance with respective examples.

DETAILED DESCRIPTION

Synthesizing a program for a given synthesis task, which includes specification, includes synthesizing a program that is consistent with the specification. In an example, the specification may include a small, e.g., one, two, three, five, etc., number of input-output pairs. These input-output pairs may be thought of as examples, wherein the synthesized program generates the output when passed the input for each of the input-output pairs. A synthesized program is consistent with the specification when the program generates the corresponding output when passed in the corresponding input for the input-output pairs in the specification. Providing more input-output pairs in the specification helps the synthesizer create a more accurate program. However, as the user provides the input-output pairs, increasing the number of input-output pairs requires the user to do more work. In addition, not all input-output pairs have the same impact on synthesizing a correct program, e.g., a program that is consistent with the specification. Input-output examples may be duplicative in that pairs after the first pair are not useful in synthesizing a more correct program. Expecting a user to be able to create a small number of the most useful input-output pairs, however, places an unrealistic requirement on the user. Program synthesis may be used to clean up and format data or join elements from different data elements into a single data element. For example, a spreadsheet application may include individual parts of an address and the synthesized program combines these individual parts into a complete address. How the synthesized program does the combination is specified via the provided specification.

In various embodiments, a specification is used to synthesize multiple programs. Then additional inputs that are readily available to the user are used to generate/predict the corresponding outputs. The user may then select an erroneous output to correct. Upon entering part of the correct output, e.g., the prefix or the first part of the output, the input and the prefix of the correct output may be used by the synthesized programs to predict possible outputs. The user may then select one of these outputs. The selected output may then be considered part of the specification and a more correct synthesized program may then be selected and run on available additional data. In this manner, the described techniques achieve a variety of technical advantages including, but not limited to, quickly identifying useful input-output examples that leads to faster synthesis of more correct programs, predicting possible outputs speeding up the time to build a specification, reducing a memory footprint based on a specification with a small number of useful input-output pairs, and reducing processor load by synthesizing more accurate programs.

Figure 1:
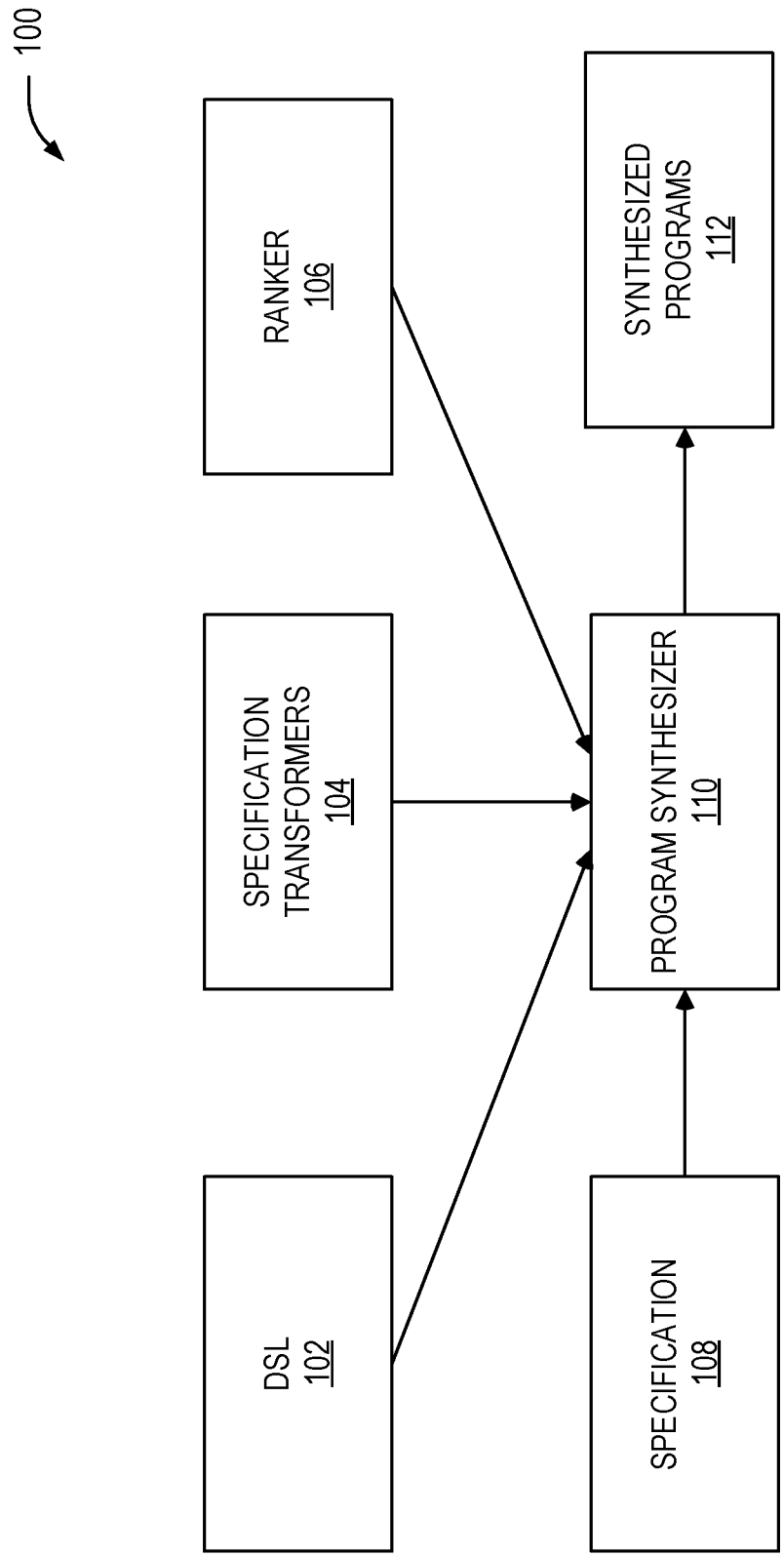
FIG. 1 is a block diagram of a program synthesis system in accordance with respective examples.

FIG. 1 is a block diagram of a program synthesis system 100 in accordance with respective examples. A domain-specific language (DSL) 102 describes a space of programs that a program synthesizer 110 searches in synthesizing a program. In an example, the synthesized program is a program written in the DSL 102. The DSL 102 may include terminal symbols and non-terminal symbols. A non-terminal symbol expands to one or more grammar symbols or operator applications, whose arguments might themselves be grammar symbols. Terminal symbols are symbols that cannot be expanded further. The DSL 102 may also include function symbols. Function symbols have well-defined and computable semantics.

An example DSL is shown below in TABLE 1 and is a DSL that performs text transformations. Programs in this DSL take as input a list of strings and produce a single string as the output.

TABLE 1

| | | |
|---|---|---|
| string *start* | := | $e$; |
| string *e* | := | $f$ |
| | | \| CONCAT($f, e$); |
| string *f* | := | CONSTSTR($s$) |
| | | \| let $x$: string = *input*[*idx*] in *ss*; |
| string *ss* | := | $x$ \| SUBSTRING($x, pp$); |
| (int, int) *pp* | := | ($pos, pos$); |
| int *pos* | := | $k$ |
| | | \| REGEXPOS($x, r, r, k$); |
| int $k$, *idx*; | | |
| regex $r$; | | |
| string $s$; | | |
| string[ ] *input*; | | |

The identifiers in TABLE 1 that are in italics represent terminal or non-terminal symbols. The identifiers in all capitals are function symbols. For instance, the symbols CONCAT, CONSTSTR, SUB STRING, and REGEXPOS are function symbols.

The DSL in TABLE 1 symbolically and compactly represents a set of programs. Any program that is obtained by the following steps belongs to the DSL.

1. Start with the symbol start.
2. Repeat until no symbols other than input and function symbols remain:
   a. Select a terminal or non-terminal symbol, e.g., start.
   b. If the chosen symbol is a terminal symbol, then replace the symbol with a value. For example, if the chosen symbol is k, then an integer, e.g., 42, may be selected based on the "int k" definition. For the symbol s, s may be replaced with a string, e.g., "foo", based on "string s."
   c. If the chosen symbol is a non-terminal, then replace the symbol with an allowed expansion. For example, if the chosen symbol is ss, then the symbol may be replaced with either x or the program fragment let x: string=input[idx] in ss the symbols idx and ss will then be expanded in subsequent iterations.

To synthesize a program, a specification 108 is provided as input. The specification 108 describes the behavior of the desired program. The specification 108 may include a small number of input and output examples. The small number of examples may be one, two, three, etc. The specification 108 may include fragments of formal logic rather than input and output examples. In an example, a spreadsheet application may include rows of data. Data from one or more columns may be used as input to generate input-output examples.

The program synthesizer 110 uses specification transformers 104. Some specification transformers 104 may generate possible prefixes of possible output. The program synthesizer 110 may generate programs by starting from the symbol start and expanding that symbol to e. The symbol e may be expanded to the function application CONCAT(f,e). The program synthesizer 110 may now generate sub-specifications for the symbols f and e appearing within the CONCAT operator. The specification transformer for CONTAT is used to generate the sub-specifications. The specification transformer for CONCAT knows the semantics of the CONCAT operator. In an example, the CONCAT specification transformer may generate the following specification for CONCAT's first argument: "John Galt"→"Galt, John"∨ "Galt, Joh"∨ "Galt, Jo", etc., where v is the same as "or." In this example, the CONCAT may generate all possible prefixes of the possible output. The specification transformer for the second argument of the CONCAT function works in a similar way.

Following this example, the program synthesizer 110 has decomposed the problem of synthesizing "Galt, John" from "John Galt" into sub-goals at two levels. First, at the level of specifications for the symbols f and e, the first and second arguments to the CONCAT operation. Second, at the level of possible outputs, where a program for each possible prefix of the output "Galt, John" may be synthesized. The program synthesizer 110 may then repeat in a recursive manner on the symbols f and e until terminal symbols are reached. A ranker 106 is used to select sub-goals solutions to determine which solution to select as part of one of one or more synthesized programs 112. The ranker 106 attempts to select the "best" program/sub-program. In an example, the synthesizer 110 may generate many different synthesized programs 112 that are consistent with the specification. The ranker 106 may then rank the synthesize programs 112 and the highest ranking synthesized program may be used to generate additional output from additional input that was not used in synthesizing the synthesized program.

The program synthesizer 110 is able to handle partial output. For example, in input-output example may be provided that includes the full input and only part of the output, e.g., the prefix of the output. Normally, a synthesized program and/or sub-goal would be considered correct if the output of the program/sub-goal is equal to the output. In various embodiments, correctness is relaxed such that an output that matches the prefix of the output is considered correct. Accordingly, any data after the prefix in an output from a program/sub-goal is unbounded. In other words, anything after the prefix is allowed to be considered correct. This allows the synthesized programs 112 to create different output for the same input, but remain consistent with the output having the same prefix. As described in greater detail below, the different output may be used to quickly build the specification with additional input-output examples and/or select a more correct synthesized program.

Figure 2:
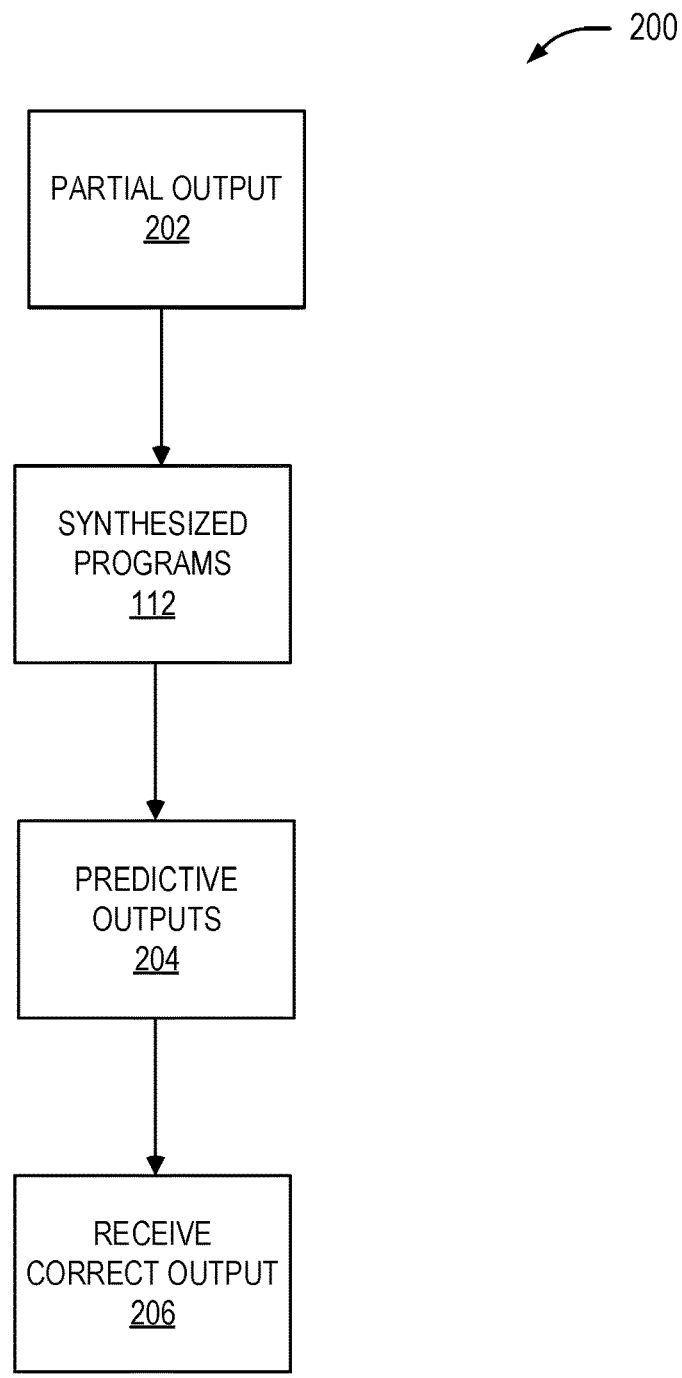
FIG. 2 is a block diagram of system for receiving corrective output in accordance with respective examples.

The more input-output examples that the program synthesizer 110 has as input allows the program synthesizer 110 to synthesize programs that produce correct output over a larger set of input. The multiple synthesized programs 112 may be used to quickly expand the number of input-output examples in the specification 108. In addition, the additional input-output examples may include input on which an original highest ranking synthesized program is used to generate incorrect output. FIG. 2 is a block diagram of system for receiving corrective output in accordance with respective examples. Partial output 202 for an input may be received by the program synthesizer 110 or by an interface that interacts with the program synthesizer 110. The partial output 202 may be used as an input-output example, but with the output as the prefix of the desired output and not the complete desired output. For example, if the desired output is "ABC 123," a prefix of "A", "AB", "ABC", "ABC 1", etc., may be the partial output 202 for the input. The input may be passed into each of the synthesized programs 112 to generate predictive outputs. Any predictive output that does not match the partial output may be eliminated. In an example, the synthesized program that created output that did not match the partial output may be removed from the synthesized programs 112. The predictive outputs that match the partial output 202 may be provided as predictive outputs 204. One of the predictive outputs 204 may be selected as corrective output 206. The corrective output 206 is an output that is different from the output generated by the previously highest ranking synthesized program.

Once the corrective output 206 is received, the synthesized programs that are consistent with the new input-output example may be ranked and the highest ranking synthesized program may then be selected. The new input-output example is the input-output example that was based on the partial output 202 but includes the entire corrective output 206. In an example, the complete input-output example is added to the specification and a new set of synthesized programs are synthesized using the updated specification. The specification may also be updated with additional examples that are determined to be correct. These examples may be added to the specification and then the synthesizer may synthesize the synthesized programs 112 using the updated specification.

An example of using synthesized programs with partial output transformers is using data from a spreadsheet to quickly identify examples of incorrect output. FIG. 3A is an example spreadsheet application where some data is used an input-output examples in accordance with respective examples. A column 302 includes data. In this example, the column 302 includes a list of names. The user may provide the desired output in column 304. In this example, there are two cells 310 and 312 that contain output. The remainder of the cells in the column 302 are blank. In this example, the specification includes the two input-output examples based on rows 1 and 2 and columns 302 and 304, e.g., "John Galt"->"Galt, John" and "John Doe"->"Doe, John". These two input-output examples may be used to synthesize one or more programs that are consistent with the two input-output examples. Once synthesized, the synthesized programs may be ranked and the highest-ranking program used to generate output for rows that do not have any data in the column 304. FIG. 3B is an example spreadsheet application where output data is generated using a synthesized program in accordance with respective examples. Output in cells 320, 322, and 324 is output generated by the highest ranking synthesized program based on the respective input from column 302.

As the output in the rows below row 2 in column B 304 is generated by a synthesized program, the output may not be correct for all input. For example, cell 322 contains an erroneous output. Here, erroneous output is output that is not desired by the user. In this example, the user may want "Bonham, John" as the output rather than "Henry Bonham, John." The highest ranking synthesized program, however, only had the two input-output examples whose input was of the form "first last" for use the specification. There were no input-output examples with the input being "first middle last." In FIG. 3B, the user may select cell 322 and begin typing the desired output. FIG. 4 is an example spreadsheet application where a prefix of corrective output is used to predict the entire output in accordance with respective examples. Output 402 has now been typed in the cell that had previously contained "Henry Bonham, John." The output 402 is a prefix, "Bo" of the desired output "Bonham, John." The output 402 is entered by the user and is the start of the final output for the input "John Henry Bonham." The output 402 along with the input "John Henry Bonham" may be received and used as to select possible outputs. For example, the input "John Henry Bonham" may be passed as input to the other synthesized programs, i.e., the non-highest-ranking programs. Output from the non-highest ranking program that is consistent with the output 402 may be used as possible complete output.

In another example, the output 402 along with the input "John Henry Bonham" may be added to the specification and a new set of programs synthesized. In this example, specification transformers are used such that symbol's that produce output whose prefix are the same as the output 402 are considered correct. In typical program synthesis, the produced output matches the output entirely to be considered correct. The specification may also be expanded to include an input-output example from row 3, i.e., "Mitch Mitchell"->"Mitchell, Mitch". This may be done since the user skipped row 3 and corrected output in row 4. Any rows between the explicit input-output examples, e.g., rows 1 and 2, and a corrected output row, e.g., row 4, may be included as correct input-output examples.

Either the previously synthesized programs or a new set of synthesized programs are used to generate predictive output 404, 406, 408, 410. The predictive output 404, 406, 408, 410 may be thought of as auto-complete options for the input-output example for row 4. The predictive output 404, 406, 408, 410 is output from a synthesized program whose prefix matches the output 402. Once generated and displayed, the user may select any of the predictive output 404, 406, 408, 410 rather than continue to type out all of the output. Selecting a complete output helps reduce typographical errors originating from a user typing the complete output. Each of the predictive outputs 404, 406, 408, 410 is associated with synthesized programs that generated the same output.

FIG. 5 is an example spreadsheet application where output data is updated based on selecting a corrective output value in accordance with respective examples. In this example, the user has selected predictive output 404 as the correct output for the input "John Henry Bonham." Once the predictive output 404 is selected, a highest ranking synthesized program that is consistent with the input-output examples from rows 1, 2, and 4 is selected. The highest ranking synthesized program may also be consistent with the input-output example from row 3. The highest-ranking program is different from the synthesized program that was used to generate the output shown in FIG. 3B. The new highest ranking synthesized program is closer to the desired output based on the user's selection on output 404, and the new highest ranking synthesized program generating the desired output 404. The highest ranking synthesized program may then be run on all of the inputs from column 302 that were not part of the specification used to synthesize the highest ranking synthesized program or user selected output such as 404. Some output 502, 504, 506 may be consistent with the output from the previously used synthesized program. The new highest ranking synthesized program, however, may create output different from the previously used synthesized program. For example, output 510 is now different and consistent with the rest of the output in column 304. In this example, output 510 has been corrected by the new highest ranking synthesized program based on the user selected output 404 but without requiring the user to provide any indication that the previous output was incorrect. Accordingly, allowing the user to select completed output from a provided output prefix helps identify useful examples for synthesizing more accurate programs.

Figure 6:
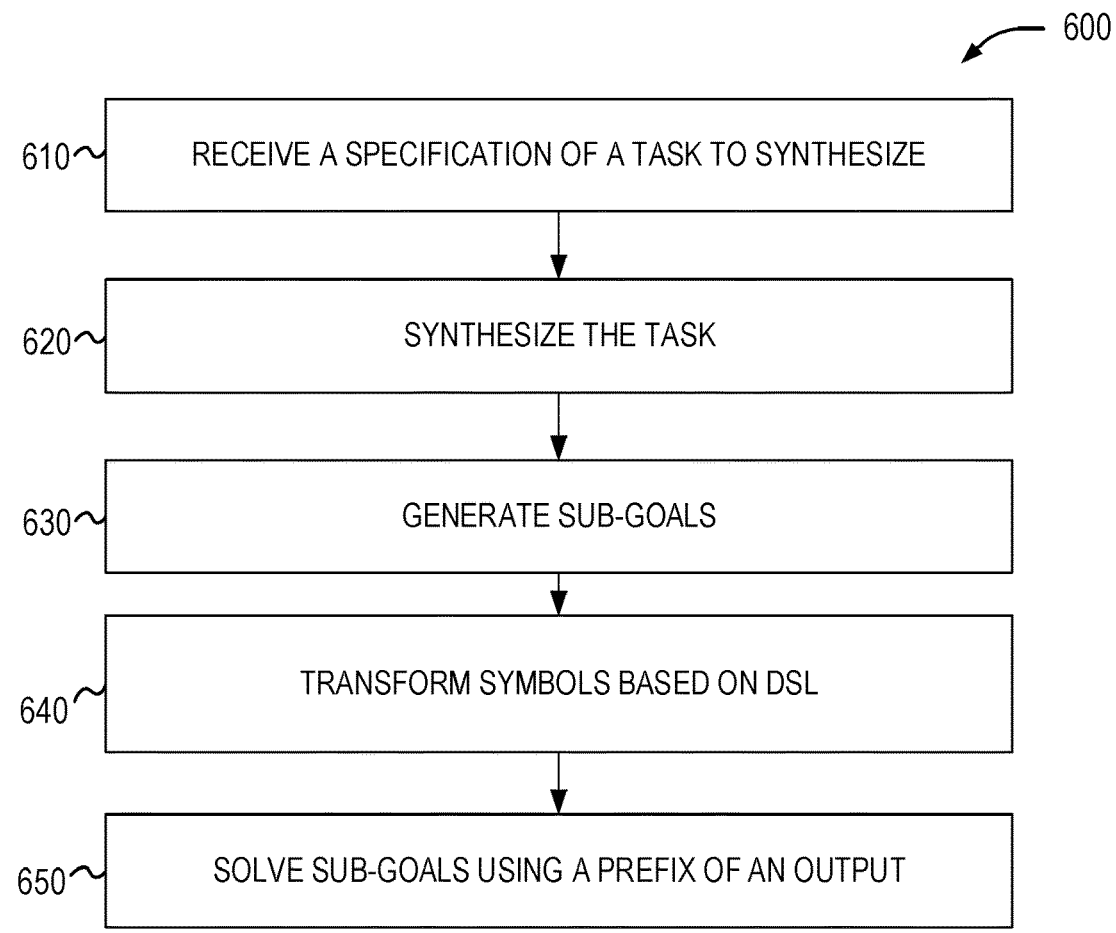
FIG. 6 is a flow diagram of a process for synthesizing programs with output prefix specification transformers in accordance with respective examples.

FIG. 6 is a flow diagram of a process for synthesizing programs with output prefix specification transformers in accordance with respective examples. The process 600 may be executed on a computing device. At 610, a specification that describes a task is received. The specification is used to synthesize a program that does the task. Here, the synthesized program does the task by generating output that is consistent with the specification. In an example, the specification includes one or more input-output examples. For a specific input, the synthesized program generates the corresponding output. The specification may also include an input-output example where the output is not the complete output. Rather, the output may a part of the final output. In example, the output may be the prefix of the complete output. The synthesized program is generated in a domain specific language.

At 620, the program that does the task is synthesized. For example, the program may be synthesized by the program synthesizer 110. The synthesis includes generating sub-goals at 630 based on the specification. Sub-goals may be generated by decomposing the input-output examples into smaller input-output pairs. For example, one input-output example may be "John Galt"->"Galt, John". A first sub-goal that may be generated includes splitting the input based on a regular expression that identifies the first space. So "John Galt"->"John" and "Galt". Additional layers of sub-goals may be recursively generated. For example, a sub-goal could swap the position of the two strings in the above example. The sub-goals may include a symbol that is defined in the DSL. At 640, the symbol may be transformed using a symbol transformer. The symbol transformer may take the partial output. As part of the synthesis, the output from the symbol transformer will be consistent with the input-output examples from the specification. Normally, the output is the complete output and the output from the final program matches the entire output. This does not work, however, for partial output. To account for partial output, an output is correct if the partial output appropriately matches the output. For example, the partial output may be a prefix of the output and any output that starts with the partial output is considered correct. Accordingly, anything beyond the prefix is unbounded.

At 650, the generated sub-goals are solved. Solving the sub-goals ensure that the sub-goals are consistent with the appropriate specifications. Because the sub-goals may be generated in a recursive nature, the specification for each sub-goal may be different. The final synthesized program is consistent with the received specification, from 610. For sub-goals that are in various layers of recursion, a specification may be generated based on the received specification and previous layers of recursion. For example, a sub-goal may have a sub-specification and may provide a modified list of input-output examples based on the input-output examples from the received specification. For example, the specification may include input which is the first word from the input and the output as the second word from the output. When this sub-goal is solved, the corresponding sub-program will be consistent with the sub-specification.

Figure 7:
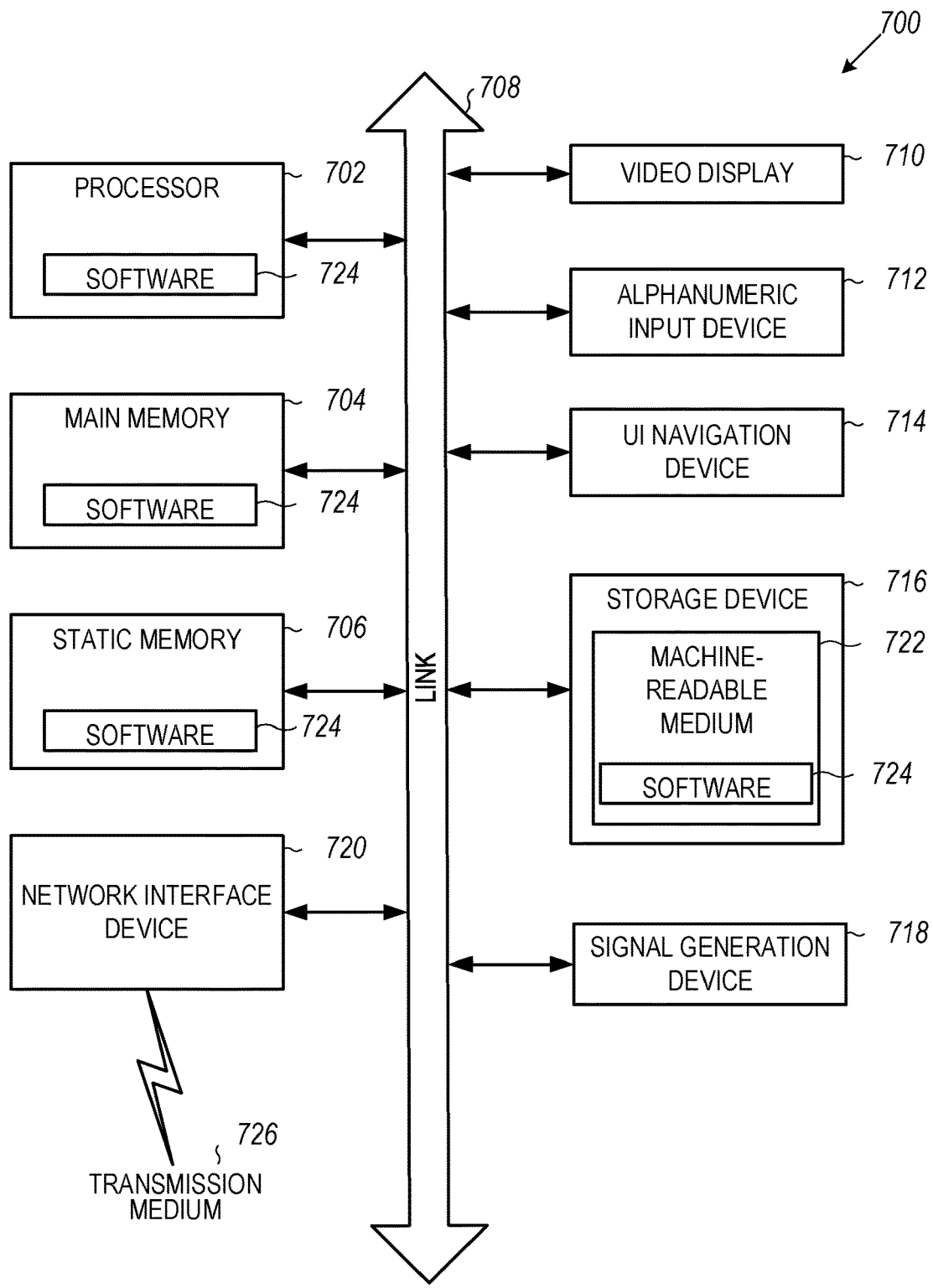
FIG. 7 is an example computing device that can be used in conjunction with the technologies described herein.

FIG. 7 is an example computing device that can be used in conjunction with the technologies described herein. In alternative embodiments, the computing device 700 may operate as a standalone device or may be connected (e.g., networked) to other computing devices. In a networked deployment, the computing device 700 may operate in the capacity of a server communication device, a client communication device, or both in server-client network environments. In an example, the computing device 700 may act as a peer computing device in peer-to-peer (P2P) (or other distributed) network environment. The computing device 700 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. The computing device 700 may implement the specification transformers 104, the ranker 106, the program synthesizer 110, and perform the method of FIG. 6.

Computing device 700 may include a hardware processor 702 (e.g., a central processing unit (CPU), a graphics processing unit (GPU), a hardware processor core, or any combination thereof), a main memory 704 and a static memory 706, some or all of which may communicate with each other via a link (e.g., bus) 708. The computing device 700 may further include a display unit 710, an input device 712 (e.g., a keyboard), and a user interface (UI) navigation device 714 (e.g., a mouse). In an example, the display unit 710, input device 712, and UI navigation device 714 may be a touch screen display. In an example, the input device 712 may include a touchscreen, a microphone, a camera (e.g., a panoramic or high-resolution camera), physical keyboard, trackball, or other input devices.

The computing device 700 may additionally include a storage device (e.g., drive unit) 716, a signal generation device 718 (e.g., a speaker, a projection device, or any other type of information output device), a network interface device 720, and one or more sensors, such as a global positioning system (GPS) sensor, compass, accelerometer, motion detector, or other sensor. The computing device 700 may include an input/output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 716 may include a computing-readable (or machine-readable) storage media 722, on which is stored one or more sets of data structures or instructions 724 (e.g., software) embodying or utilized by any one or more of the techniques or functions described herein. In an example, at least a portion of the software may include an operating system and/or one or more applications (or apps) implementing one or more of the functionalities described herein. The instructions 724 may also reside, completely or at least partially, within the main memory 704, within the static memory 706, and/or within the hardware processor 702 during execution thereof by the computing device 700. In an example, one or any combination of the processor 702, the main memory 704, the static memory 706, or the storage device 716 may constitute computing device (or machine) readable media.

While the computer-readable storage media 722 is illustrated as a single medium, a "computer-readable storage media" or "machine-readable storage media" may include a single medium or multiple media (e.g., a centralized or distributed database, and/or associated caches and servers) configured to store the one or more instructions 724.

In an example, a computer-readable storage media or machine-readable storage media may include any medium that is capable of storing, encoding, or carrying instructions for execution by the computing device 700 and that cause the computing device 700 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 720 may use the transfer protocols to transmit data using transitory propagating signals.

In an example, the network interface device 720 may include one or more physical jacks (e.g., Ethernet, coaxial, or phone jacks) or one or more antennas to connect to the communications network 726. In an example, the network interface device 720 may include one or more wireless modems, such as a Bluetooth modem, a Wi-Fi modem or one or more modems or transceivers operating under any of the communication standards mentioned herein. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques. In an example, a transmission medium may include any intangible medium that is capable of storing, encoding or carrying instructions for execution by the computing device 700, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computer implemented method comprising:
   receiving a first specification for a task including an original set of input output pairs;
   synthesizing a set of programs based on the first specification, including a highest-ranking program;
   executing the highest-ranking program on a new set of inputs to generate new outputs;
   receiving a selection of a first one of the new set of inputs for which a corresponding output is incorrect;
   receiving a portion of a correct output corresponding to the selected first one of the new set of inputs;
   generating matching outputs from the synthesized set of programs other than the highest-ranking program that match at least the portion of the correct output;
   receiving a selection of one of the matching outputs that matches the correct output; and
   adding the resulting input and correct output to the first specification to form a second specification.

2. The method of claim 1 and further comprising:
   synthesizing a new set of programs based on the second specification; and
   selecting an updated highest ranking program from the new set of programs.

3. The method of claim 2, wherein output from the updated highest-ranking program is consistent with the original set of input output pairs.

4. The method of claim 1, wherein the new set of inputs comprises inputs of the first specification.

5. The method of claim 4 wherein synthesizing a set of programs based on the first specification comprises:
   generating a plurality of sub-goals based on the specification, wherein each of the plurality of synthesized programs comprise a solved subset of the plurality of the sub-goals, and wherein a sub-goal comprises a symbol in the DSL;
   transforming the symbol based on the DSL and the portion of the output; and
   solving the plurality of sub-goals based on the transforming of the symbol using the input and the corresponding portion of the output to generate the plurality of synthesized programs, wherein the portion of the output matches a portion of an output from each of the plurality of synthesized programs.

6. The method of claim 1 wherein the set of programs are synthesized in a domain specific language (DSL).

7. The method of claim 1 wherein the portion of a correct output comprises a prefix of the correct output.

8. The method of claim 1 wherein the new set of inputs includes inputs not in the original set of input output pairs.

9. A system for synthesizing programs comprising:
   a processor; and
   a memory device coupled to the processor and storing instructions for causing the processor to perform operations comprising:
   receiving a first specification for a task including an original set of input output pairs;
   synthesizing a set of programs based on the first specification, including a highest-ranking program;
   executing the highest-ranking program on a new set of inputs to generate new outputs;
   receiving a selection of a first one of the new set of inputs for which a corresponding output is incorrect;
   receiving a portion of a correct output corresponding to the selected first one of the new set of inputs;
   generating matching outputs from the synthesized set of programs other than the Highest-ranking program that match at least the portion of the correct output;
   receiving a selection of one of the matching outputs that matches the correct output; and
   adding the resulting input and correct output to the first specification to form a second specification.

10. The system of claim 9 wherein the operations further comprise:
    synthesizing a new set of programs based on the second specification; and selecting an updated highest ranking program from the new set of programs.

11. The system of claim 10, wherein output from the updated highest-ranking program is consistent with the original set of input output pairs.

12. The system of claim 10 wherein the portion of a correct output comprises a prefix of the correct output.

13. The system of claim 9 wherein the new set of inputs comprises inputs of the first specification.

14. The system of claim 9 wherein the set of programs are synthesized in a domain specific language (DSL).

15. The system of claim 14 wherein synthesizing a set of programs based on the first specification includes operations comprising:
   generating a plurality of sub-goals based on the specification, wherein each of the plurality of synthesized programs comprise a solved subset of the plurality of the sub-goals, and wherein a sub-goal comprises a symbol in the DSL;
   transforming the symbol based on the DSL and the portion of the output; and
   solving the plurality of sub-goals based on the transforming of the symbol using the input and the corresponding portion of the output to generate the plurality of synthesized programs, wherein the portion of the output matches a portion of an output from each of the plurality of synthesized programs.

16. The system of claim 9 wherein the new set of inputs includes inputs not in the original set of input output pairs.

17. A computer-readable storage medium storing computer-executable instruction for synthesizing programs, the stored instructions to cause a processor to perform operations comprising:
   receiving a first specification for a task including an original set of input output pairs;
   synthesizing a set of programs based on the first specification, including a highest-ranking program;
   executing the highest-ranking program on a new set of inputs to generate new outputs;
   receiving a selection of a first one of the new set of inputs for which a corresponding output is incorrect;
   receiving a portion of a correct output corresponding to the selected first one of the new set of inputs;
   generating matching outputs from the synthesized set of programs other han the highest-ranking program that match at least the portion of the correct output;
   receiving a selection of one of the matching outputs that matches the correct output; and
   adding the resulting input and correct output to the first specification to form a second specification.

18. The storage medium of claim 17 wherein the operations further comprise:
   synthesizing a new set of programs based on the second specification; and
   selecting an updated highest ranking program from the new set of programs, wherein output from the updated highest-ranking program is consistent with the original set of input output pairs and wherein the new set of inputs comprises inputs of the first specification.

19. The storage medium of claim 18 wherein synthesizing a set of programs based on the first specification includes operations comprising:
   generating a plurality of sub-goals based on the specification, wherein each of the plurality of synthesized programs comprise a solved subset of the plurality of the sub-goals, and wherein a sub-goal comprises a symbol in the DSL;
   transforming the symbol based on the DR, and the portion of the output; and
   solving the plurality of sub-goals based on the transforming of the symbol using the input and the corresponding portion of the output to generate the plurality of synthesized programs, wherein the portion of the output matches a portion of an output from each of the plurality of synthesized programs.

20. The storage medium of claim 17 wherein the portion of a correct output comprises a prefix of the correct output.

* * * * *